US008107206B2

(12) United States Patent
Johansson

(10) Patent No.: US 8,107,206 B2
(45) Date of Patent: Jan. 31, 2012

(54) SURGE ARRESTER

(75) Inventor: Daniel Johansson, Grängesberg (SE)

(73) Assignee: ABB Technology Ltd., Zürich (CH)

( * ) Notice: Subject to any disclaimer, the term of this patent is extended or adjusted under 35 U.S.C. 154(b) by 236 days.

(21) Appl. No.: 12/520,685

(22) PCT Filed: Dec. 13, 2007

(86) PCT No.: PCT/EP2007/063876

§ 371 (c)(1), (2), (4) Date: Jun. 22, 2009

(87) PCT Pub. No.: WO2008/077808

PCT Pub. Date: Jul. 3, 2008

(65) Prior Publication Data

US 2010/0053837 A1 Mar. 4, 2010

(30) Foreign Application Priority Data

Dec. 22, 2006 (EP) .................................... 06445076

(51) Int. Cl.

| | |
|---|---|
| ***H02H 1/00*** | (2006.01) |
| ***H02H 1/04*** | (2006.01) |
| ***H02H 3/22*** | (2006.01) |
| ***H02H 9/06*** | (2006.01) |

(52) U.S. Cl. ......... 361/117; 361/118; 361/126; 361/127

(58) Field of Classification Search .................. 361/117, 361/127

See application file for complete search history.

(56) References Cited

U.S. PATENT DOCUMENTS

| | | | | |
|---|---|---|---|---|
| 5,159,748 | A * | 11/1992 | Doone et al. | 29/613 |
| 5,517,382 | A * | 5/1996 | Leupp et al. | 361/118 |
| 5,757,604 | A * | 5/1998 | Bennett et al. | 361/127 |
| 5,930,102 | A * | 7/1999 | Rook | 361/127 |
| 5,942,968 | A | 8/1999 | Schmidt | |
| 6,435,782 | B1 * | 8/2002 | Hillhouse | 408/72 B |
| 7,522,399 | B2 * | 4/2009 | Siljeholm et al. | 361/127 |

FOREIGN PATENT DOCUMENTS

| | | | |
|---|---|---|---|
| EP | 1143460 | A | 10/2001 |
| WO | WO-2004/097858 | A | 11/2004 |

OTHER PUBLICATIONS

PCT/ISA/210—International Search Report—May 21, 2008.
PCT/ISA/237—Written Opinion of the International Searching Authority—May 21, 2008.

* cited by examiner

*Primary Examiner* — Dharti Patel
(74) *Attorney, Agent, or Firm* — Venable LLP; Eric J. Franklin

(57) ABSTRACT

A surge arrester for medium and high voltages includes a length adjustment device and pivot unit.

6 Claims, 1 Drawing Sheet

SURGE ARRESTER

CROSS-REFERENCE TO RELATED APPLICATIONS

This application claims priority to European patent application 06445076.0 filed 22 Dec. 2006 and is the national phase under 35 U.S.C. §371 of PCT/EP2007/0063876 filed 13 Dec. 2007.

FIELD OF INVENTION

The present invention generally relates to surge arresters and is particularly directed to medium or high voltage surge arresters having a reduced number of parts for facilitating assembly thereof.

BACKGROUND

Surge arresters are used to protect expensive electrical equipment in power systems from overvoltages. A common product for this purpose is cylindrical blocks of metal oxide, for example zinc oxide, so-called varistors. These have the property that the resistance is high at low voltage but low at high voltage.

When the operating voltage is higher than one single varistor can resist and still exhibit a high resistance, several varistor blocks are connected in series in a stack. To carry large currents through a stack, a sufficient contact pressure must be achieved between the blocks. This is achieved by providing clamping members, which connect first and second end electrodes, and a length adjustment device provided between the first electrode and the stack of varistors, which ensures that the clamping members exert sufficient pressure on the varistor blocks.

To achieve improved resistance to transversal mechanical influence, a central pivot member is placed between the lower end electrode and the nearest zinc-oxide block in the stack.

An example of a prior art surge arrester is disclosed in the European patent publication EP1625600 A1, which is incorporated herein by reference.

SUMMARY OF THE INVENTION

An object of the present invention is to provide a surge arrester for medium and high voltages, wherein the number of components is minimized.

Another object is to provide a surge arrester, which is easy to assemble.

The invention is based on the realization that the prior art length adjustment device and pivot washer can be combined into one single unit provided between the stack of varistor blocks and the lower end electrode.

According to a first aspect of the invention a combined length adjustment and pivot unit for a surge arrester is provided, which is characterized by a first part, and a second part having a pivot surface, wherein the first and second parts are mutually axially adjustable.

According to a second aspect of the invention a surge arrester is provided comprising: a stack of a plurality of cylindrical varistor blocks, which are arranged one after the other in the axial direction of the varistor blocks, a first end electrode and a second end electrode, clamping means, which connect the first end electrode to the second end electrode, and an electrically insulating, outer casing, the surge arrester being characterized by such a combined length adjustment and pivot unit provided between the stack of varistor blocks and the second end electrode.

According to a third aspect of the invention a method of assembling a surge arrester, said method comprising the following steps: providing a first end electrode, providing a second end electrode, providing a stack of a plurality of cylindrical varistor blocks, which are arranged one after the other in the axial direction of the varistor blocks between the first and second end electrodes, providing a length adjustment device, providing a pivot unit between the stack of varistor blocks and the second end electrode, providing clamping means, which connect the first end electrode to the second end electrode, and providing an electrically insulating, outer casing, the method being characterized in that the length adjustment device and the pivot unit are provided as one unit.

By providing a combined length adjustment and pivot unit, several advantages are obtained. The number of parts in the surge arrester is reduced since the prior art length adjustment device and pivot washer are replaced by one single unit. Also, no through hole is needed in the first electrode for manipulating the length adjustment device. Finally, the provision of the combined length adjustment and pivot unit enables a full thread length in the second end electrode.

Further preferred embodiments are defined by the dependent claims.

BRIEF DESCRIPTION OF DRAWINGS

The invention is now described, by way of example, with reference to the accompanying drawings, in which.

DETAILED DESCRIPTION OF PREFERRED EMBODIMENTS

In the following a detailed description of a preferred embodiment of the present invention will be given. In this description, the term “medium and high voltages” will be used for voltages of 1 kV and higher. Today, the upper limit in commercial high voltage devices is 800 kV but even higher voltages, such as 1000 kV or more, are already built or envisaged in the near future.

References are made herein to directions, such as “upper” and “lower”. It should be realized that these references are non-limiting and only refer to what is shown in the figures.

Figure 1:
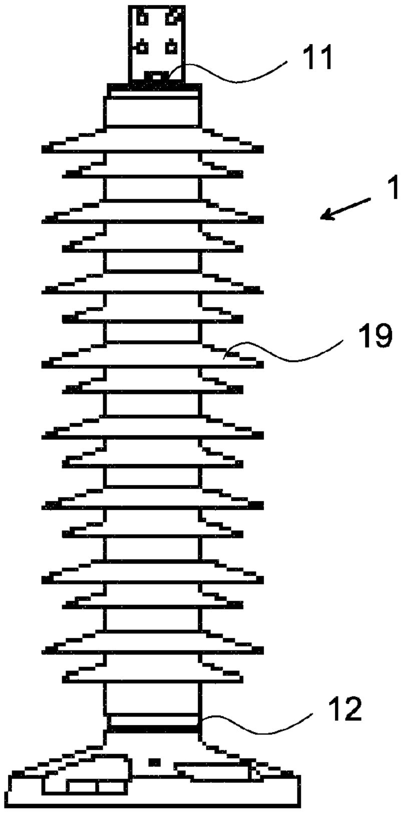
FIG. 1 schematically shows a surge arrester embedded into an electrically insulating casing.

FIG. 1 shows a surge arrester 1 with an upper first end electrode 11 arranged to be connected to a line voltage, a lower second end electrode 12 arranged to be connected to ground, and an electrically insulating casing 19 surrounding the interior of the surge arrester 1. The end electrodes 11, 12 are preferably made of some suitable metal, such as aluminium.

Figure 2:
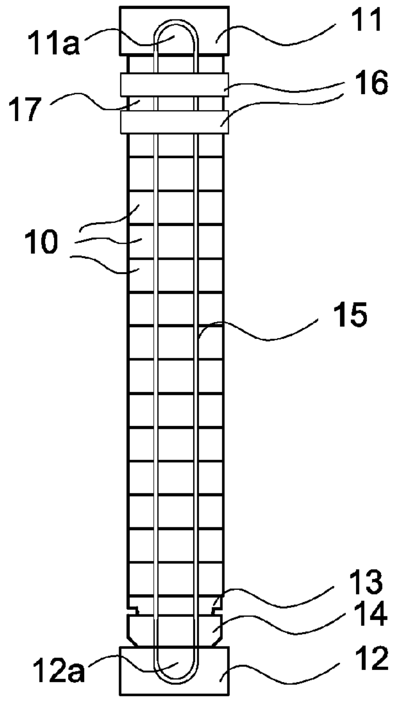
FIG. 2 schematically shows the surge arrester of FIG. 1 prior to being embedded into the electrically insulating casing.

FIG. 2 shows the surge arrester 1 of FIG. 1 without the electrically insulating casing. A stack comprising sixteen cylindrical varistor blocks 10 preferably made of metal oxide and of circular cross section is arranged between the upper end electrode 11 and the lower end electrode 12. The symmetry axes of the varistor blocks 10 coincide so as to form an essentially vertical stack. The height and diameter of the individual blocks 10 depend on the application in question. An example of dimensions is a diameter of 60 mm and a height of 40 mm.

Clamping members 15 are arranged around the stack 10 in the form of a plurality of loops, one 15 of which is shown in the figure. The loops 15 are wound of continuous glass fibre and impregnated with epoxy. The loops 15 run around shoulders 11*a* of the upper end electrode 11 and shoulders 12*a* of the lower end electrode 12 and clamp the end electrodes 11, 12 against the stack 10, thus creating the desired contact pressure between the varistor blocks 10.

Outside the loops 15 there is a bursting-protective bandage in the form of a plurality of rings 16, two of which are shown in the figure. The bandages are placed essentially at the centre of the height for the respective varistor blocks 10. The rings 16 are wound of fibres, such as aramide fibres in an epoxy matrix and make tight contact with the loops 15 so that these are pressed against the varistor blocks 10. The height of the rings 16 depends on the application and suitable dimension for the above mentioned example is 20 mm with a thickness of 5 mm. Between two adjacent rings 16, opposite to the contact surface between the varistor blocks 10 in question, there is an annular opening 17, about 20 mm high, to allow pressure relief in case of a short circuit event.

Figure 3:
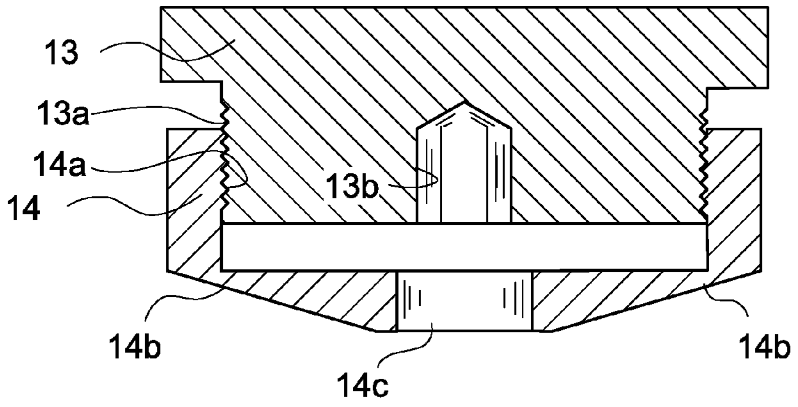
FIG. 3 is an axial section through a combined length adjustment device and pivot member according to the invention.

Above the lower end electrode 12, between the electrode and the varistor stack 10, there is provided a combined length adjustment and pivot unit 13, 14. A detailed sectional view of this unit is shown in FIG. 3. The combined length adjustment and pivot unit 13, 14 has an essentially circular cross sectional shape corresponding to that of the varistor blocks 10 and comprises two interconnected parts: an upper first part 13 and a lower second part 14 which are mutually axially adjustable. These two parts are interconnected by means of cooperating threads 13*a*, 14*a* on the upper and lower part, respectively. By means of mutual rotation between the upper and lower parts, the total length or height of the unit 13, 14 can be adjusted. The function of the length adjustment is to lengthen the stack between the two end electrodes, i.e., the varistor stack and the combined length adjustment and pivot unit, so that the clamping force in the loops 15 really provides the desired contact pressure between the varistor blocks in the stack 10.

The bottom surface of the lower part 14 is provided with a pivot in order to unload the varistor stack and to reduce the occurrence of block gaps during horizontal mechanical stresses on the surge arrester. The pivot is in the form of a slanting outer portion 14*b* of the bottom surface. The slanting enables a certain degree of tilting of the combined length adjustment and pivot unit 13, 14 which avoids or at least reduces mechanical stress on the varistor stack 10. The radius of the pivot can be determined in some suitable way, such as by simulations.

The lower part 14 is provided with an axial central through hole 14*c* aligned with an axial hole 13*b* in the bottom surface of the upper part 13. The axial hole 13*b* has a non-circular cross sectional shape, preferably hexagonal cross sectional shape. This non-circular hole is used during assembly, as will be explained below.

A method of assembling the surge arrester will now be described. First, the varistor blocks 10, the end electrodes 11, 12, and the combined length adjustment and pivot unit 13, 14 are provided in a cradle in the order shown in FIG. 2. The combined length adjustment and pivot unit has its minimum length when put into the cradle. The loops 15 are then attached to the end electrodes and the two end electrodes 11, 12 are moved from each other so as to extend the flexible loops 15. The upper part 13 of the combined length adjustment and pivot unit is then rotated while the lower part 14 is kept fixed against rotation. The length of the combined length adjustment and pivot unit is extended as much as possible with the flexible loops extended to provide a prestressing force on the block stack 10. The rotation of the upper part 13 is preferably achieved by means of a hexagon socket screw key which is inserted into the hole 13*b* via an axial hole (not shown) through the lower electrode 12 and the through hole 14*c* in the lower part 14.

After the combined length adjustment and pivot unit has been extended, the two end electrodes are released so that they exert a pressure on the varistor stack 10 by means of the force in the loops 15. The bursting-protective bandage 16 is applied to the varistor stack where after the assembly comprising the varistor stack, the combined length adjustment and pivot unit, and the end electrodes, is provided in the protective housing 19.

A preferred embodiment of a surge arrester according to the invention has been described. A person skilled in the art realizes that this could be varied within the scope of the appended claims. Thus, although only one surge arrester has been shown and described, it will be realized that two or more surge arresters can be serially connected to handle higher voltages.

The invention claimed is:

1. A surge arrester, comprising:

a first end electrode, a second end electrode, a stack of a plurality of cylindrical varistor blocks, which are arranged one after the other in the axial direction of the varistor blocks between the first and second end electrodes, a clamping member configured to connect the first end electrode to the second end electrode, and an electrically insulating, outer casing, a combined length adjustment and pivot unit comprising a first part, and a second part having a pivot surface, wherein the first and second parts are mutually axially adjustable.

2. The surge arrester according to claim 1, wherein the combined length adjustment and pivot unit is provided between the stack of varistor blocks and the second end electrode.

3. The surge arrester according to claim 1, wherein the first part and the second part of the combined length adjustment and pivot unit are interconnected with cooperating threads on the first part and the second part, respectively.

4. The surge arrester according to claim 1, wherein the pivot surface of the combined length adjustment and pivot unit comprises a slanting outer portion of the bottom surface of the second part.

5. The surge arrester according to claim 1, wherein the second part of the combined length adjustment and pivot unit comprises an axial central through hole aligned with a non-circular axial hole in the bottom surface of the first part.

6. A method of assembling a surge arrester, said method comprising:

providing a first end electrode, providing a second end electrode, providing a stack of a plurality of cylindrical varistor blocks, which are arranged one after the other in the axial direction of the varistor blocks between the first and second end electrodes, providing a length adjustment device, providing a pivot unit between the stack of varistor blocks and the second end electrode, providing a clamp to connect the first end electrode to the second end electrode, and providing an electrically insulating, outer casing, wherein the length adjustment device and the pivot unit are interconnected and provided as one single unit.

* * * * *